Jan. 25, 1938.                B. RONAY                2,106,190
                            ARCRONOGRAPH
                         Filed Sept. 12, 1933           2 Sheets-Sheet 1

INVENTOR
*Bela Ronay*
BY
*Harold Dodd*
ATTORNEY

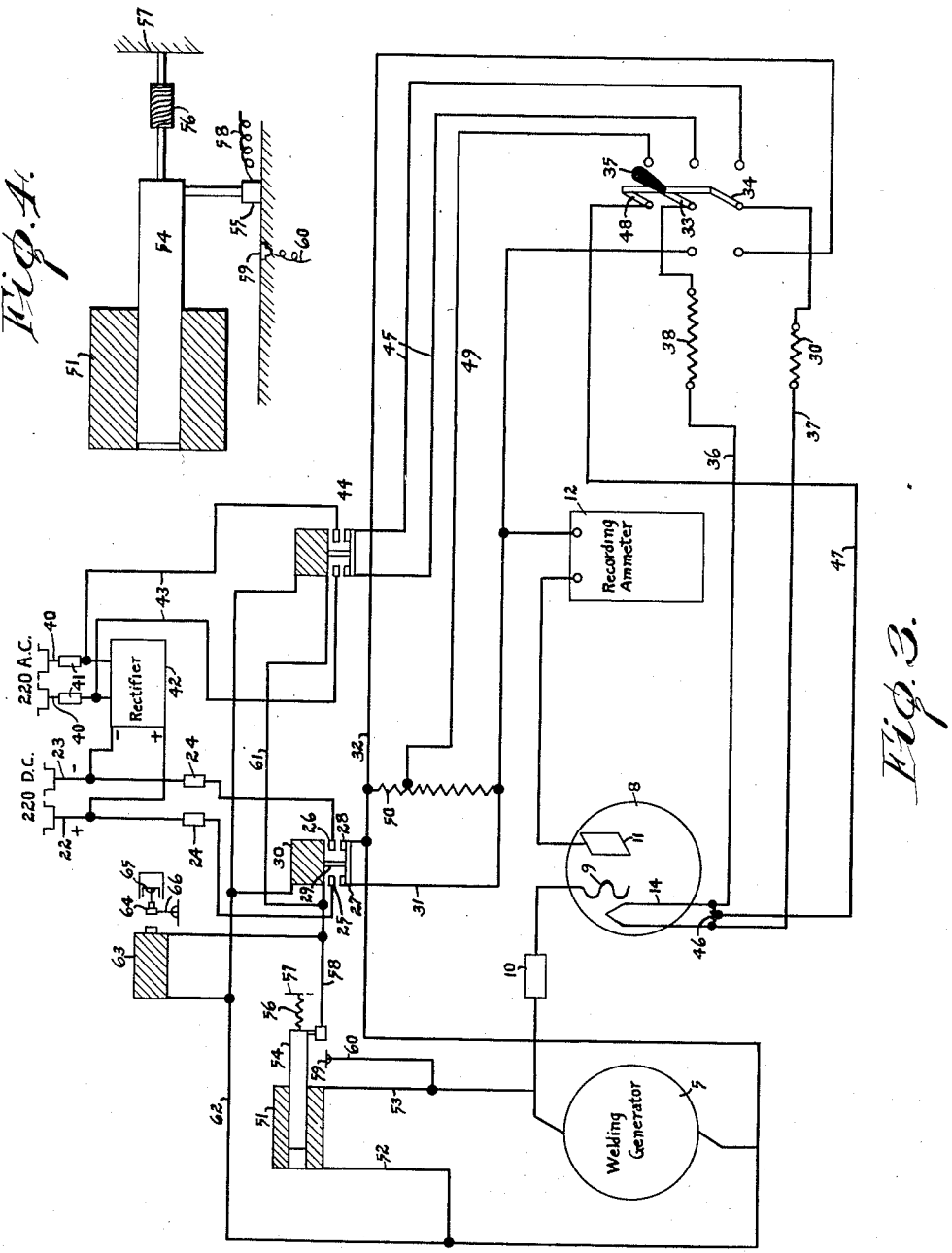

UNITED STATES PATENT OFFICE 2,106,190

ARCRONOGRAPH

Bela Ronay, Annapolis, Md.

Application September 12, 1933, Serial No. 689,119

13 Claims. (Cl. 219—8)

(Granted under the act of March 3, 1883, as amended April 30, 1928; 370 O. G. 757)

This invention relates to an apparatus for and method of investigating the electric characteristics of an electric welding circuit and for comparing the quality of welds made by the use of such welding system.

It is the object of this invention to provide a means and method for determining when the welding electrode is properly positioned with respect to the work and when the correct current for a given electrode is being used, thereby securing workmanship of higher quality.

A further object is to provide means for training unskilled workers in the art of welding by making available a visible record of the results of their manipulation of the apparatus.

In the drawings:

Fig. 3 is a schematic lay-out of my invention adapted to the use of either direct or alternating current;

Fig. 4 is a detail of the automatic control switch.

Figure 1:
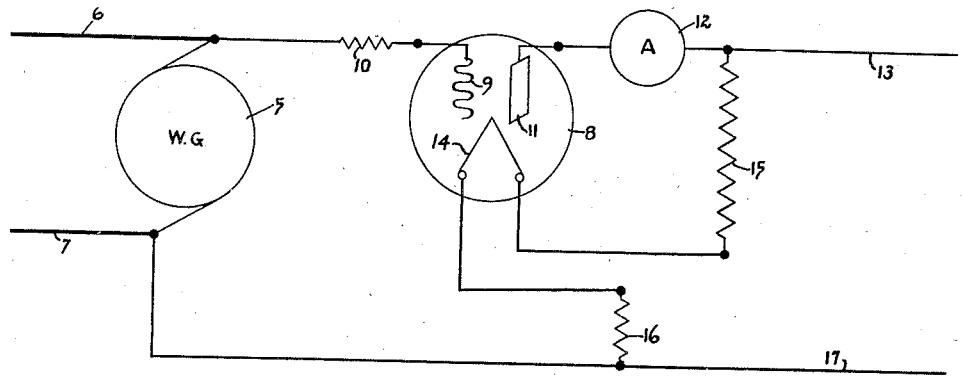
Fig. 1 shows schematically the essential elements of my invention.

The importance of securing uniformly good results in electric arc welding made necessary the investigation of the physical properties of the metal arc. In the course of this study it was found that particles of metal from an electrode travel through the arc at regular intervals and each particle has a definite volume. This volume depends upon the chemical and physical properties of the electrode itself and is influenced to a very great extent by the properties of the covering material when covered electrodes are used.

The welding performance of an electrode depends upon the frequency with which particles are detached from the end thereof, the volume of the individual particles, and the time consumed by the particles in traveling through the arc. The greater the frequency of the passage of particles, the smaller is the volume of the individual particles and the faster their rate of travel through the arc. It is established that small particles passing at frequent intervals make for higher efficiency of the electrode.

It was found that, corresponding to the state of the individual particles, there are different arc characteristics throughout the time of welding. During the formation, or melting period of the particle there is a pure electric arc condition that pre-heats the base metal, preparing it to fuse with the particle deposited on it from the electrode. During the time of passage of the particle from the electrode through the arc to the work there exists an actual short circuit period. The relationship between the time involved in these two stages is a measure of the performance of the electrodes and since the quality of the weld depends upon the performance of the electrode, the ratio of these times is a measure of that quality.

To deposit a definite volume of liquid metal from the electrode and make a good bead, a corresponding volume of the base metal must reach the molten condition. It takes, for any given amount of power, more time to melt the required amount of base metal, as it has more mass and a correspondingly greater capacity for heat conduction than the electrode. Hence the necessity that the arc stage be longer than the short circuit stage. The energy dissipated between the electrode and the base metal during the short circuit period is less than 10% of that during the arc period, so that during the short circuit period the energy available in the above mentioned part of the welding circuit is practically all used in the transfer of the particle. When the procedure is an uninterrupted, regular series of long arc periods and brief short circuit periods, it is evident that what follows is the fusing of the molten base with the molten particles deposited thereon from the electrode. If the regularity of the alternations of these stages is interrupted for any appreciable length of time, the above condition can not exist. An interruption may be caused by non-metallic material in the molten base metal or by explosion of non-metallic particles contained in the electrode. The continuity of the weld is broken proportionately to the length of such interruption.

During a unit length of time there are a certain number of arc periods that occupy a definite part of the time unit, the remainder of the unit being made up by the short circuit periods. An instrument responding to either period alone would necessarily have to be equipped with an indicator of practically no inertia to follow the rapid succession of the two stages. This condition can not be attained in practice, therefore a recording instrument responsive to both periods is used, and such instrument will assume a position that is proportional to the relative duration of the arc stage and the short circuit stage.

In Fig. 1 the welding generator 5 has welding circuit leads 6 and 7 connected to its positive and negative terminals, respectively. The three-element vacuum tube 8 has its grid 9 connected to the positive terminal of generator 5 through a suitable grid leak 10. The plate 11 is connected, through a high inertia ammeter 12 that is preferably of the recording type, to a wire 13 that is one side of a direct current supply circuit of suitable potential, preferably 220 volts. The filament 14 is heated by current from wire 13 which is passed through the resistances 15 and 16 to give the proper potential drop across the filament, the wire 17 forming the return side of the circuit.

When generator 5 is not running but the current in wires 13 and 17 is on, the plate 11 has a positive charge and the grid 9 receives a negative charge from wire 17 through generator 5 sufficient to block the tube so that the ammeter 12 gives a zero reading. If generator 5 is driven and is run idle, it develops a high open circuit voltage and since the positive terminal thereof is connected to grid 9, a positive potential is impressed upon the grid to unblock the tube and give a saturated plate current, imparting a maximum deflection to the indicating element of ammeter 12. If the generator is then short-circuited, a condition results that is almost the same as when the generator is not running and the flow of plate current is entirely blocked or greatly diminished, causing the meter 12 to register zero, or nearly zero plate current. The passage of a particle from the welding electrode to the base metal approximates the short-circuit condition, while the arc stage gives practically the same effect as running the generator on open circuit. Since, during the welding operation, these stages follow each other with extreme rapidity, the indicating element of meter 12 will assume a position that shows the ratio between the times occupied by the two stages. For example, if the arc period be three times as long as that required for the passage of the particle through the arc, the meter 12 will indicate approximately 75% of its maximum reading.

Figure 2:
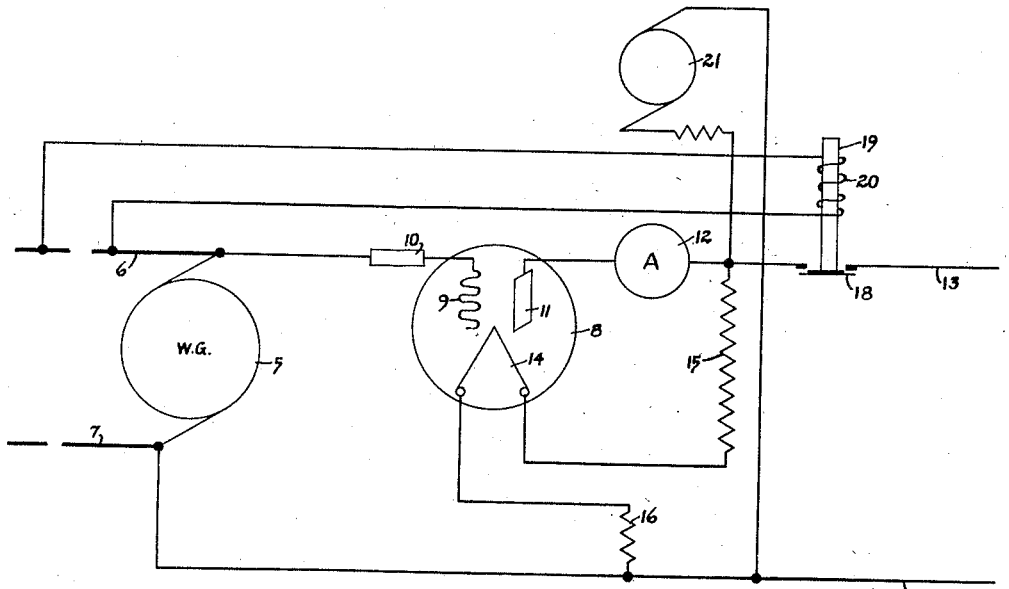
Fig. 2 illustrates schematically a recording mechanism operatively connected to the elements shown in Fig. 1 and means for automatically actuating the apparatus.

In Fig. 2 the apparatus is in general similar to that in Fig. 1 and similar parts have been given the same reference characters. However, in Fig. 2 a switch 18 has been provided in the wire 13. A solenoid core 19 is connected to the switch 18 to close the circuit when coil 20 is energized; this coil is supplied with current from the welding circuit when current is being drawn therethrough, that is, when a weld is being made. Thus the indicating mechanism is automatically cut in as soon as welding begins and cut out when that operation ceases. A motor 21 to drive the chart upon which the indications of meter 12 are recorded is connected in parallel with the indicating mechanism and is therefore driven whenever switch 18 is closed.

Fig. 3 shows my invention adapted to operate the recording mechanism from either a direct current or an alternating current supply. The positive side of the direct current circuit is the wire 22 and the negative side thereof is wire 23. These wires are connected, through fuses 24, to contacts 25 and 26, respectively. Movable contacts 27 and 28 are carried by core 29 of a solenoid 30 and thereby, when solenoid 30 is energized, are moved against contacts 25 and 26 and connect the direct current supply to wires 31 and 32 which latter wires may be connected, through blades 33 and 34 of double throw switch 35, with the leads 36 and 37 to filament 14 of vacuum tube 8. Resistances 38 and 39 are connected into the leads 36 and 37 to give the correct potential drop through filament 14.

The alternating current supply wires 40 are connected through fuses 41 to a power pack or rectifier 42 whereof the positive and negative output terminals are respectively connected to wires 22 and 23 of the direct current supply circuit. Wires 43 carry unrectified alternating current to the solenoid operated switch, designated in its entirety by reference numeral 44, similar to the solenoid operated switch in the direct current circuit. From switch 44 the unrectified current is conducted by wires 45 to contacts engageable by blades 33 and 34 of switch 35 to supply current for heating filament 14. A resistance 46 is connected across the terminals of filament 14 and a center tap lead 47 connects this resistance to blade 48 of switch 35 whereby, when the switch 35 is thrown to supply filament 14 with unrectified alternating current, the center tap wire 47 is connected to a wire 49. A resistance 50 is connected across wires 31 and 32 and to this the wire 49 is connected at such a point that the portions of resistance 50 on opposite sides of the point of connection have the same ratios to each other as do resistances 38 and 39, to secure proper operation of power pack 42. It will be observed in Fig. 3, that the plate 11 is connected to positive wire 31 through recording meter 12 and grid 9 is connected to the positive terminal of welding generator 5 and, through the generator, to negative wire 32, to supply suitable grid potentials for the operation of tube 8.

A solenoid 51, which is connected to the welding circuit from generator 5 by wires 52 and 53, has a movable core 54 that carries a contact brush 55. Contractile spring 56 has one end connected to core 54 and the other end secured to a suitable fixed member 57 and tends to draw the core out of the solenoid. When the generator is not running and the solenoid 51 is not energized, the brush 55, which is connected to solenoid 30 by wire 58, occupies the position shown in Fig. 3; when the generator is running but no current is flowing in the welding circuit, there is a maximum current in solenoid 51 and the core is drawn to its extreme retracted position with brush 55 substantially against solenoid 51, but during the welding process the voltage of the generator drops and the flow of current through solenoid 51 is just sufficient to retract core 54 to an intermediate position where brush 55 rests upon a contact 59 that is connected to the positive terminal of the generator by wire 60 and thus current is supplied, through lead 58, to solenoid 30 and also, through wire 61, to the solenoid of electromagnetic switch 44 and both the direct current and alternating current circuits are closed as soon as the welding begins, which insures the operation of the recording mechanism. Obviously, as soon as the welding stops, core 54 will be drawn into solenoid 51, the flow of current to the electromagnetic switches will be interrupted and the recording mechanism will cease to function. It is necessary that both the alternating current circuit and the direct current circuit be closed through relays 30 and 44 when the alternating current supply is being used and, while relay 44 may be open if the supply is direct current, no detrimental result can follow if closed, since switch 35 will be thrown to connect the direct current circuit only with tube 8. The return wire for the electromagnetic switches is designated by reference numeral 62.

In its preferred form, the chart upon which the indications of meter 12 are recorded is driven by a clock mechanism (not shown). The operation of this clock mechanism is controlled by a solenoid 63 connected across wires 58 and 62 which acts upon a magnetic element 64 that carries a movable contact 65 to close a circuit to set the clock mechanism in operation; when current is not flowing in the welding circuit the spring 66 upon which element 64 is mounted opens the circuit and stops the clock mechanism.

The details of solenoid 51 and the parts immediately coacting therewith are shown on an enlarged scale in Fig. 4.

The operation of the mechanism shown in Fig. 3, when using alternating current, is as follows:

Switch 35 is thrown to the right to connect filament leads 36 and 37 with wires 45 that supply unrectified current to the filament. When generator 5 is started, solenoid 51 is energized and brush 55 is moved to a position to the left of contact 59. Closing the welding circuit weakens the current through solenoid 51 and spring 56 moves brush 55 upon contact 59, whereupon current flows through solenoid 30 and the solenoid of switch 44 and closes the circuits controlled thereby. The filament of tube 8 is heated and operating potentials are impressed upon plate 11 and grid 9. During the arc stage the indicating element of meter 12 will be urged to its maximum displacement from zero, while during the short circuit stage, (the passage of a particle from the electrode to the base metal) the indicator will tend to return to zero, but due to the rapid change from one stage to the other and the inertia of the recording mechanism the indicating element will take up a position that is proportional to the duration of the two stages. Likewise, the inertia of core 54, brush 55 and spring 56 holds the brush in contact with element 59 and keeps the circuit closed through the switch solenoids through the brief short-circuit stage in each arc-short circuit cycle. The operation on direct current will be the same as above described except that switch 35 will be thrown to the left and the rectifier will be inoperative.

When using bare or coated electrodes it is possible to vary the arc length to a considerable extent without breaking the arc. An abnormally short arc decreases the resistance proportionately to the reduction of the gap and consequently the flow of current increases; under such conditions the greater flow of current may exceed the conducting capacity of the electrode and melt it at a rate greater than that of the fusion of the base metal. The result is poor penetration, giving an imperfect bonding and a porous deposit, which is shown by the indication of the meter being below normal.

When an excessively long arc is maintained the resistance of the gap increases and the flow of current decreases in proportion. The reduced current input requires more time to melt off a unit volume of electrode and consequently there is a greater heating of the base metal which, being the positive end of the arc, has a greater heat concentration than the electrode. The result is increased penetration at the cost of overheated base metal. Again, the deposit is porous and, in addition, is badly contaminated with nitrogen that is picked up during the long passage through the arc. This is shown by an excessively high reading of the indicating meter. My invention also shows when the current is unduly great. This condition is analogous to that created by an abnormally short arc, but is even more exaggerated, the reading of the meter falls below normal and the deposit is found to be porous.

It is apparent from the foregoing that the use of the present invention will enable a welder to make a constant check upon the quality of his work and hence is of especial value in training welders. Abnormal deviations of the graph from the mean thereof may be used to locate defective spots in the weld.

The preferred voltage for the recording system is 220 since that gives a sufficient potential to place a negative charge upon grid 9 during the short circuit stage with the usual welding generator voltage but is sufficiently annulled by the positive potential from the generator during the arc stage to result in a positive charge on the grid and permit output of current from the plate. However, any other suitable voltage may be used depending upon the potential developed by the generator in any given case.

While the present invention has been described particularly with reference to electric arc welding, it is obvious that it is applicable to any type of electric welding in which analogous changes in current and voltage occur in the welding circuit.

The invention described herein may be manufactured and used by or for the Government of the United States of America for governmental purposes, without the payment of any royalties thereon.

I claim:

1. A method of indicating visually the quality of a weld deposit formed in a welding circuit wherein the voltage passes continuously and successively, during welding, through substantially the voltage of open circuit and that of short circuit, comprising the step of applying such voltage changes to operate an instrument actuatable thereby to show the proportion of a total elapsed time occupied by each of such voltage conditions.

2. A method of indicating visually the quality of a weld deposit formed in a welding circuit wherein the voltage passes continuously and successively, during welding, through substantially the voltage of open circuit and that of short circuit, comprising the steps of impressing the voltage in said welding circuit upon the grid of a biased vacuum tube whereby said tube is caused to pass a saturation plate current during the open circuit voltage stage and substantially zero current during the short circuit stage, passing said plate current through a high inertia indicating instrument actuatable thereby to indicate the relative portion of a period of time occupied by each of said conditions, and continuously recording the indication of said instrument.

3. The combination with a welding circuit wherein the voltage passes alternately through values corresponding substantially to open circuit and short circuit during the fusion of a particle of the welding electrode and the transfer of such particle to the welding, respectively, of a vacuum tube having a grid, a filament, and a plate, means connecting the said grid to one side of said circuit and said filament to the other side of said circuit, whereby said tube passes a saturation current during the time of fusing said particle and is blocked during the transfer of said particle to the weld and a high inertia indicating instrument connected to the said plate, the said instrument being thus actuated to indicate the relative durations of the fusing stage and the transfer stage.

4. A device for the purposes described, comprising a vacuum tube having a grid, a filament, and a plate, means connecting said grid to one side of an arc welding circuit and said filament to the other side thereof to impress the voltage in said circuit across the said grid and filament, means so to bias said tube that saturation current passes therethrough during the fusion of a particle of the welding rod when the voltage from said circuit is substantially that of open circuit and substantially no current passes during the substantially short circuit voltage condition while the fused particle is being transferred to the weld, and a high inertia indicating instrument connected to the said plate to indicate the relative duration of fusion and the time of transfer, substantially independently of the absolute values of the voltages.

5. The combination with an arc welding circuit of a vacuum tube having a grid, a plate, and a filament, means connecting said tube to said circuit to impress the voltage in said circuit across said grid and filament, means so to bias said tube that saturation current passes therethrough during the open circuit voltage stage while a particle of the welding electrode is being fused and substantially no current passes during the short circuit voltage stage while the particle is being transferred to the weld, and means connected to said plate and operable by the current therefrom to indicate the relative duration of said stages substantially independently of the absolute values of the voltages.

6. The combination with an arc welding circuit, of a high inertia indicating instrument, and means responsive to the voltage in said circuit connecting said instrument to said circuit to actuate said instrument to show the relative duration of the time of fusing a particle of the welding electrode and the time of transferring such particle to the weld.

7. The combination with an arc welding circuit, of a high inertia indicating instrument, and means connecting said instrument to said circuit to actuate said instrument to show the relative duration of the time of fusing a particle of the welding electrode and the time of transferring such particle to the weld.

8. A device for the purpose specified, comprising a high inertia indicating instrument and means connecting said instrument to an arc welding circuit to actuate said instrument to show the relative duration of the time of fusing a particle of the welding electrode and the time of transferring such particle to the weld, said means including a device responsive to the voltage in said circuit.

9. The method of showing visually the relative duration of voltage conditions in an arc welding circuit, which comprises applying the voltage in such circuit across the grid and the filament of a vacuum tube which is so biased that the tube passes a saturation current during the substantially open circuit voltage in the circuit during fusion of a particle of the welding rod and is blocked during transfer of the fused particle to the weld and applying the output from the plate of such tube to a high inertia measuring instrument which is thereby caused to indicate the relative duration of the time of said fusion and the time of said transfer.

10. The method of making a continuous record indicating the quality of the weld formed by the arc process, which comprises applying the voltage in the weld circuit across a suitably biased vacuum tube whereby the tube is caused to pass a saturation current by the substantially open circuit during the fusion of a particle of the welding rod and is blocked during the substantially short circuit voltage stage while the fusing particle is being transformed to the weld, applying the output from the plate of said tube to a high inertia indicating instrument which shows the relative time of fusion and of the transfer and continuously recording the indication of said instrument.

11. The method of making, during the process of depositing a weld by the electric arc, a record indicating the quality of the weld in substantially every part of the length thereof, which comprises applying the voltage in the welding circuit to record continuously the relative duration of the time required to fuse a particle of the weld electrode and the time to transfer such fused particle to the weld, disregarding the absolute values of the voltages.

12. The method of showing visually the relative duration of voltage conditions in an arc welding circuit, which comprises applying the voltage in such circuit to an electrical network to cooperate with a constant voltage in said network to cause said network to pass a current that does not increase beyond a maximum value regardless of voltage changes tending to increase said current during the stage of substantially open circuit voltage during the fusion of a particle of the welding rod, and to prevent during the stage of transfer of said particle to the weld the flow of appreciable current in said network during said transfer, and applying the current in a portion of said network to produce an indication of the relative durations of said stages.

13. The method of making a continuous record indicating the quality of the weld formed by the arc process, which comprises applying the voltage in the welding circuit to an electrical network to cooperate with a constant voltage in said network to cause said network to pass a current that does not increase beyond a maximum value regardless of voltage changes tending to increase said current during the stage of substantially open circuit voltage during fusion of a particle of the welding rod and to prevent, during the stage of transfer of said particle to the weld, the flow of appreciable current in said network, and applying the current in a portion of said network to make a continuous record of the current changes in said portion of the network.

BELA RONAY.